United States Patent
Kumar et al.

(10) Patent No.: US 12,321,241 B2
(45) Date of Patent: Jun. 3, 2025

(54) GRANULAR LEVEL PRIORITIZED SMART DATA PROTECTION USING DECISION TREES

(71) Applicant: Dell Products L.P., Round Rock, TX (US)

(72) Inventors: Avinash Kumar, Patna (IN); Mahesh Reddy Av, Bangalore (IN); Terry O'Callaghan, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/352,268

(22) Filed: Jul. 14, 2023

(65) Prior Publication Data

US 2025/0021442 A1    Jan. 16, 2025

(51) Int. Cl.
  *G06F 16/11*   (2019.01)
  *G06F 11/14*   (2006.01)
  *G06N 20/00*   (2019.01)

(52) U.S. Cl.
  CPC ........ *G06F 11/1461* (2013.01); *G06F 16/122* (2019.01); *G06N 20/00* (2019.01); *G06F 2201/84* (2013.01)

(58) Field of Classification Search
  None
  See application file for complete search history.

(56) References Cited

U.S. PATENT DOCUMENTS

| | | | |
|---|---|---|---|
| 2014/0365264 A1* | 12/2014 | Smiley | G05B 23/0221 705/7.25 |
| 2021/0286678 A1* | 9/2021 | Reddy A V | G06F 11/1469 |
| 2022/0004433 A1* | 1/2022 | Vega | G06Q 20/145 |
| 2023/0385182 A1* | 11/2023 | Gupta | G06F 11/0775 |

* cited by examiner

*Primary Examiner* — Taelor Kim
(74) *Attorney, Agent, or Firm* — Staniford Tomita LLP

(57) ABSTRACT

A data protection system utilizes certain supervised learning processes to implement a granular level prioritized protection scheme for critical data based on decision tree processing. This process provides intelligent backup protection not only at the asset or sub-asset level, but also at the molecular level to meet the desired level of priority-based operation. Such embodiments overcome disadvantages of current systems that provide this level protection only upon management by an administrator by providing automated intelligence to provide granular protection at any appropriate data object level.

19 Claims, 6 Drawing Sheets

GRANULAR LEVEL PRIORITIZED SMART DATA PROTECTION USING DECISION TREES

TECHNICAL FIELD

Embodiments are generally directed to large-scale backup systems and more specifically to protecting data assets at granular level below that of client and server hierarchy.

BACKGROUND

With ever increasing amounts of data and the need for scalability in enterprise level data systems, the data to be backed up and restored can vary widely with regards to criticality. In normal cases, most data is routine business or operational data that is backed up on a daily or weekly basis per normal protection policies that dictate backup period, storage target, retention period, and so on. Frequently, however, certain data may be critical or sensitive in nature, and needs to be protected by more rigorous policies. Because of resource constraints and the time required to backup and restore data between different clients and storage locations, it is increasingly important to prioritize backup operations based on data criticality and other important characteristics. Otherwise, critical data may be queued behind non-critical data, which could lead to vulnerabilities in data protection.

Most current data protection schemes use client-based priority mechanisms for data protection. Such systems do not have the same mechanism at the asset level beneath the client. Backups for the clients are ranked but priority-based protection at the object level is generally missing. What is needed, therefore, is a data protection system that provides priority-based protection at granular levels (e.g., object level) below the client and server level.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. Data Domain, Data Domain Restorer, and PowerProtect are trademarks of DellEMC Inc.

BRIEF SUMMARY OF EMBODIMENTS

Embodiments are directed to a data protection system that utilizes certain supervised learning processes to implement a granular level prioritized protection scheme for critical data based on decision tree processing. This process provides intelligent backup protection not only at the asset or sub-asset level, but also at the molecular level to meet the desired level of priority-based operation. Such embodiments overcome disadvantages of current systems that provide this level protection only upon management by an administrator by providing automated intelligence to provide granular protection at any appropriate data object level.

Embodiments are also directed to prioritizing a data asset generated by a client for protection in a data protection system, by initiating a backup of the data asset by the data protection system, and classifying the data asset as critical or non-critical based on attributes associated with the data asset. The method creates data chunks of the data asset at a granular level below that of the client, tagging the each data chunk with a corresponding criticality tag. Each data chunk is then backed up in a priority order based on the corresponding criticality tag through a policy defined in the data protection system.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
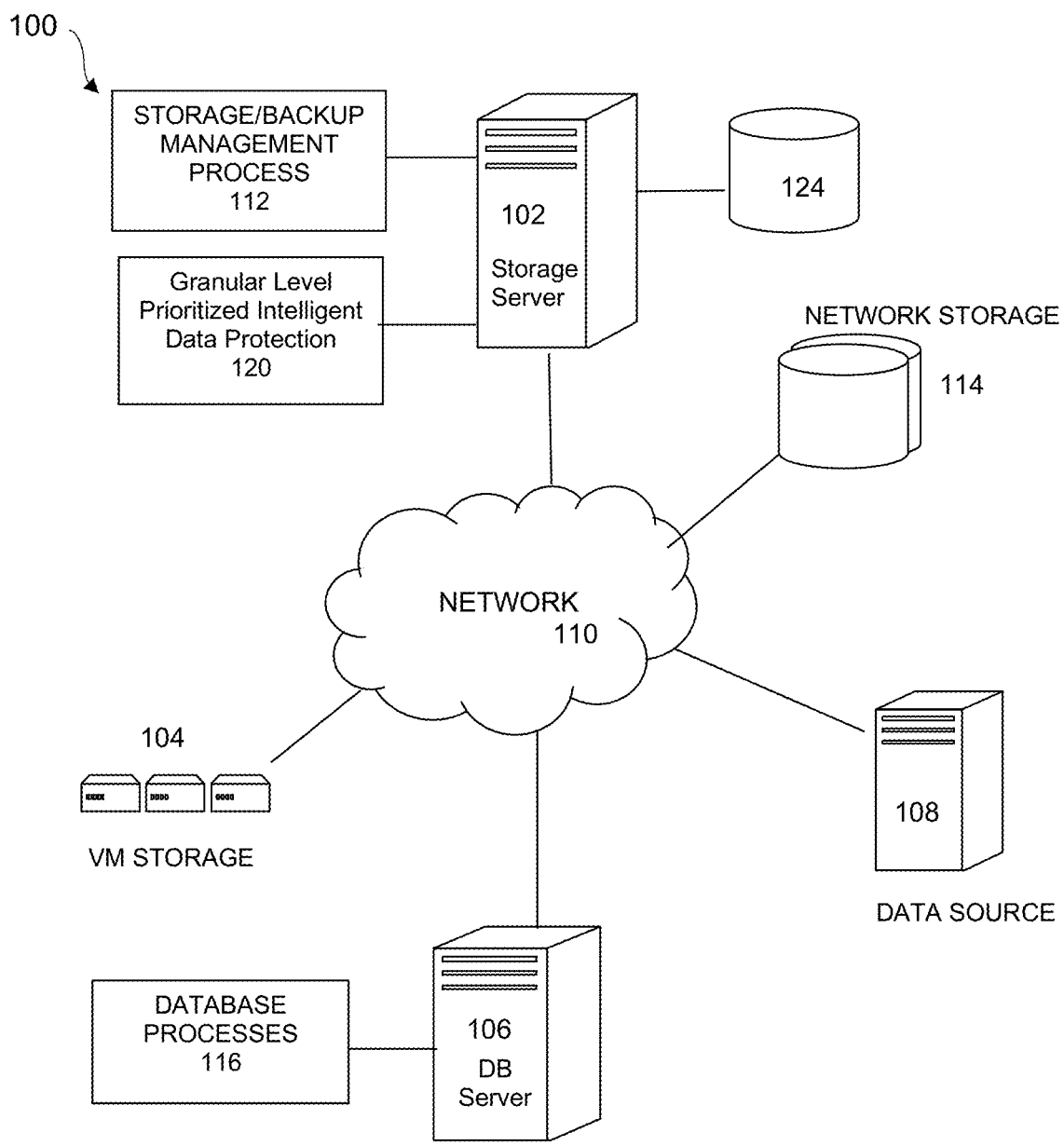
FIG. 1 illustrates a computer network system that implements one or more embodiments of a backup system using supervised learning to implement granular level prioritized protection.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. In this specification, implementations, or any other form that the invention may take, may be referred to as techniques. In general, the order of the steps of disclosed processes may be altered within the scope of the invention.

Some embodiments of the invention certain computer network techniques deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Data protection systems involve backing up data at regular intervals for restoration, replication, or data move operations based on user need and/or data corruption events. To reduce the sheer amount of data that is backed up and stored, such systems typically use some form of deduplication to eliminate redundant copies of data, such as might be present with data that is frequently backed up, but not as frequently changed in between each backup period.

The Data Domain File System (DDFS) is an example of one such deduplication file system. As the data is ingested, the filesystem anchors and segments the data. The filesystem keeps track of segments which are stored on the disk, and if the segments were to be seen again, the filesystem would just store the reference to the original data segment which was written to disk. Deduplication backups often involve periodic full backups of data from backup clients by the backup server followed by one or more incremental backups that backup only that data that has changed from a last full backup. Because of the sheer number of backup clients and the amount of data in a large scale data processing system, such backups can be very time and processor intensive.

In order to provide appropriate backup protection to users, data protection vendors often implement certain service level agreements (SLAs) and/or service level objectives (SLOs) to define and quantify certain minimum requirements with regard to backup performance. These parameters usually define characteristics such as maximum backup time per session, minimum data throughput rates, maximum data restore times, data storage terms, and so on. The vendor and/or user is allowed to define policies that control backup operations, such as backup schedules, identity and priority of backup clients and storage targets, backup data types, and so on, and such policies are usually written so that the SLA and SLO requirements are met. However, the dynamic and changing nature of different clients and data types in a backup dataset means that these policies must be similarly adaptable and dynamic to accommodate such changes.

Most backup operations involve datasets that are anticipated over the course of normal operations, and backed up through standard policies, such as daily or weekly backups to normal storage targets. Occasionally though, critical data may be introduced that needs to be treated differently with regard to backup periods, handling, and/or storage targets. For example, critical and/or sensitive (confidential) data objects may need to be backed up immediately to local storage instead of waiting for the next incremental backup to cloud storage, and so on. Present data protection systems are limited in that priority mechanisms are implemented at the client level, so that all data of a particular server are prioritized over data over other servers, regardless of the actual criticality of individual data objects in each server. Embodiments overcome this disadvantage by providing intelligent protection at the granular level to ensure priority protection to data assets in any server based on the criticality of that those data assets.

FIG. 1 illustrates a computer network system that implements one or more embodiments of a backup system using granular level prioritized data protection. In system 100 of FIG. 1, a storage server 102 executes a data storage or backup management process 112 that coordinates or manages the backup of data from one or more data sources 108 to storage devices, such as network storage 114, client storage, and/or virtual storage devices 104. With regard to virtual storage 104, any number of virtual machines (VMs) or groups of VMs (e.g., organized into virtual centers) may be provided to serve as backup targets. The VMs or other network storage devices serve as target storage devices for data backed up from one or more data sources, such as storage server 102 or data source 108, in the network environment. The data sourced by the data source may be any appropriate data, such as database data that is part of a database management system, and the data may reside on one or more hard drives for the database(s) in a variety of formats. Thus, a data source maybe a database server 106 executing one or more database processes 116, or it may be any other sources data for use by the resources of network 100.

The network server computers are coupled directly or indirectly to the data storage 114, target VMs 104, and the data sources and other resources through network 110, which is typically a cloud network (but may also be a LAN, WAN or other appropriate network). Network 110 provides connectivity to the various systems, components, and resources of system 100, and may be implemented using protocols such as Transmission Control Protocol (TCP) and/or Internet Protocol (IP), well known in the relevant arts. In a cloud computing environment, network 110 represents a network in which applications, servers and data are maintained and provided through a centralized cloud computing platform.

The data generated or sourced by system 100 and transmitted over network 110 may be stored in any number of persistent storage locations and devices. In a backup case, the backup process 112 causes or facilitates the backup of this data to other storage devices of the network, such as network storage 114. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays, such as RAID (redundant array of individual disk) arrays. In an embodiment, system 100 may represent a Data Domain Restorer (DDR)-based deduplication storage system, and storage server 102 may be implemented as a DDR Deduplication Storage server provided by EMC Corporation. However, other similar backup and storage systems are also possible.

As shown in FIG. 1, system 100 includes a granular level prioritized data protection component 120 that incorporates intelligence to automatically to prioritize data asset backups based on individual criticality, and that uses a decision tree algorithm.

Figure 2:
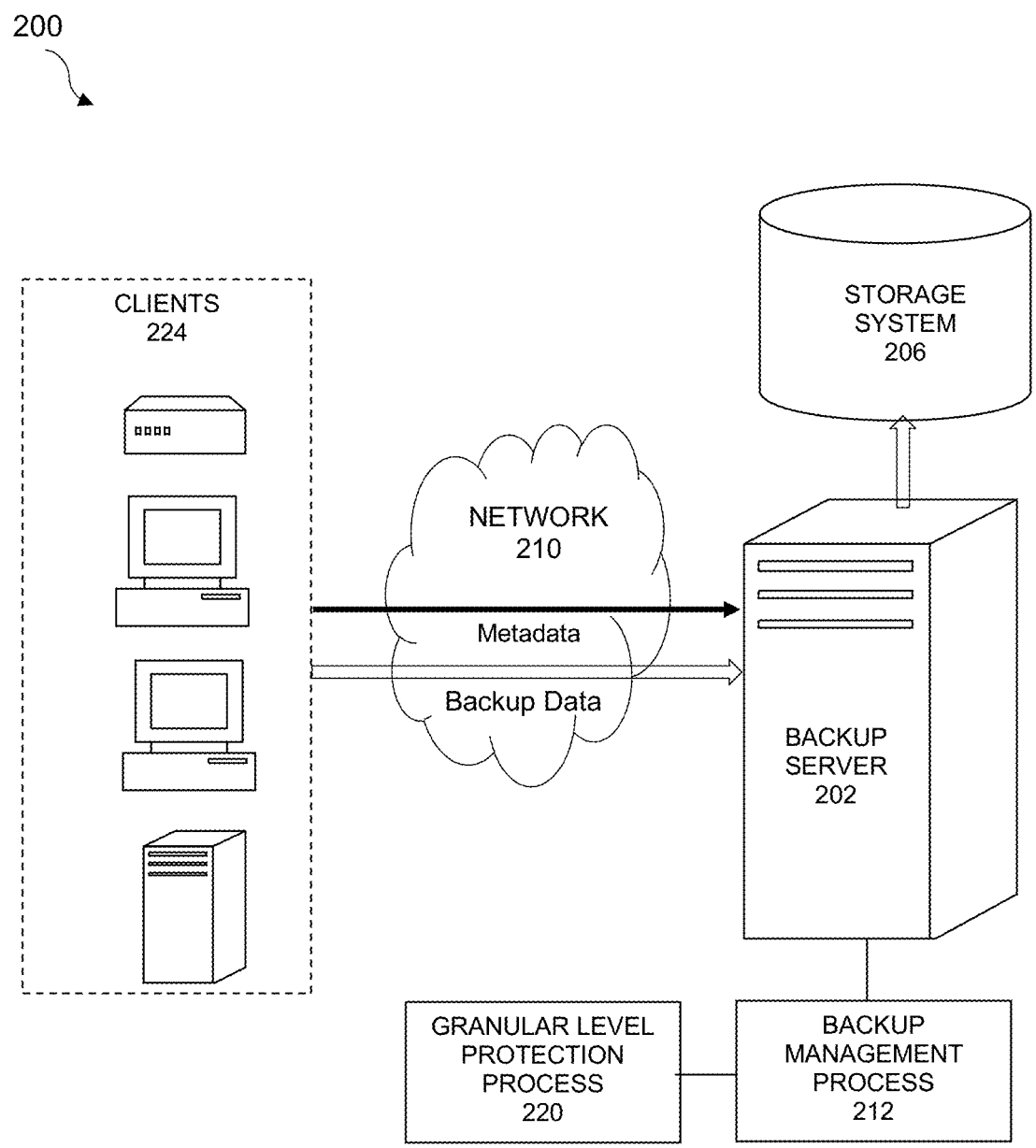
FIG. 2 illustrates a backup system with a variety of different backup clients generating data to be protected, under some embodiments.

In many a typical large-scale data protection system, there can be many different types of backup clients, each generating different data objects at different times to be included in one or more data savesets. FIG. 2 illustrates a backup system like that of FIG. 1, but with a variety of different backup clients 224, ranging from computers, laptops, mobile devices, network devices, servers, and so on, all backing up data and metadata over network 210 through backup server 202 to storage system 206 using a backup program 212. Each client generally represents a device used by a user in a variety of different ways, such as for productivity (e.g., laptop/desktop computers), communications (e.g., mobile phones), applications (e.g., tablet computers), and so on. Other clients may include sensors, IoT (Internet of Things) devices, network interfaces, and other similar devices that generate data. Each client 224 may thus generate different data that maybe subject to different protection policies based on data type, importance, volume, storage requirements, and so on.

Each client may also be categorized with respect to its priority relative to the other clients. That is, clients that are deemed critical or that generate or process critical data may be granted priority or precedence when their data is backed up. In present systems, altering this default priority at a level lower than the client level is an involved process requiring system administrator action. For example, priority-based backups are presently only implemented for a critical client by manually adding it to a critical protection policy at the time of policy creation. Embodiments are described with respect to data generated by backup clients, however, it should be noted that embodiments are not so limited. Data for protection processes (backups, restores, cloning, etc.) can be generated by server computers, workstations, or any other processor based device. The term "client level" can thus mean any computer level prioritization based on a priority of the computer itself relative to other computers acting as data sources, and may also be called "server level."

Embodiments of systems 100 and 200 include respective granular level data protection processes 120 and 220 that automatically prioritize data assets for protection based on respective priorities of the data assets at a granular rather than server-level hierarchy. Embodiments described below may apply to either component 120 in the basic backup system of FIG. 1, or component 220 in the multi-client backup system of FIG. 2.

The component (120 or 220) facilitates execution of backup/restore processes to data objects that may include critical data requiring special protection treatment. As stated previously, present systems impose client level prioritization or require manual handling of these backups. Embodiments of the granular level protection process 220 eliminates the need for this manual procedure or the imposition of a default client level hierarchy and provides an intelligent solution powered by certain supervised learning process to prioritize protection of these data objects at appropriate granular levels. For example, highly critical data files stored in a remote server that may itself not be tagged as critical, will be accorded priority over non-critical files stored in a critical server.

Figure 3:
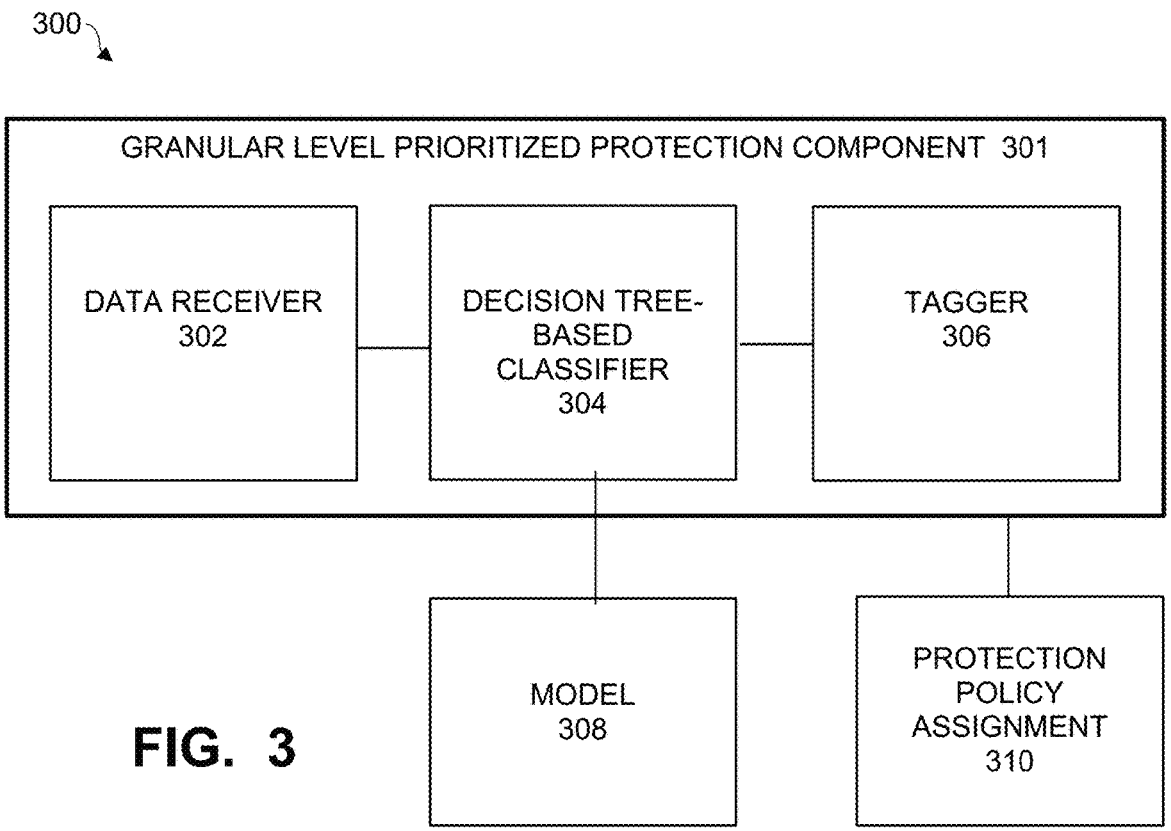
FIG. 3 is a block diagram of a granular level prioritized protection component, under some embodiments.

FIG. 3 is a block diagram of a granular level prioritized protection component 301, under some embodiments. As shown in FIG. 3, component 301 includes a data receiver 302 that receives data objects that require special handling, such as may be presented for backup by backup servers. Such data is termed "critical" or "sensitive" data and comprises data that is protected through prioritized backup and restore operations, as compared to "normal" data that may be backed up and restored through default prioritization. Component 301 includes a classifier 304 that provides prioritization of the data object (or asset) at a level beneath the client, such as at the object level or other lower-level.

In an embodiment, the classifier 304 considers the criticality of the data asset at the file system or database level below the client. This can be termed the "molecular" level, which can be any level below the computer level so that the system 300 provides priority-based protection based on the criticality of file systems, databases, and other data objects within the client.

In an embodiment, classifier component 304 uses a decision tree algorithm to determine the category of the criticality of data assets for data backup cycles based on multiple features. A decision tree algorithm is a machine learning (ML) or supervised learning algorithm that uses a decision tree structure to make predictions about the input. It follows a tree-like model of decisions and their possible consequences and works by recursively splitting the data into subsets based on the most significant feature at each node of the tree. The tree structure is made up of nodes where each internal node denotes a test on an attribute, each branch represents an outcome of the test, and each leaf node (terminal node) holds a class label. It is constructed by recursively splitting the training data into subsets based on the values of the attributes until a stopping criterion is met, such as the maximum depth of the tree or the minimum number of samples required to split a node. During training, the decision tree algorithm selects the best attribute to split the data based on a metric (e.g., entropy or Gini impurity) that measures the level of impurity or randomness in the subsets. The algorithm finds the attribute that maximizes the information gain or the reduction in impurity after the split.

Figure 4:
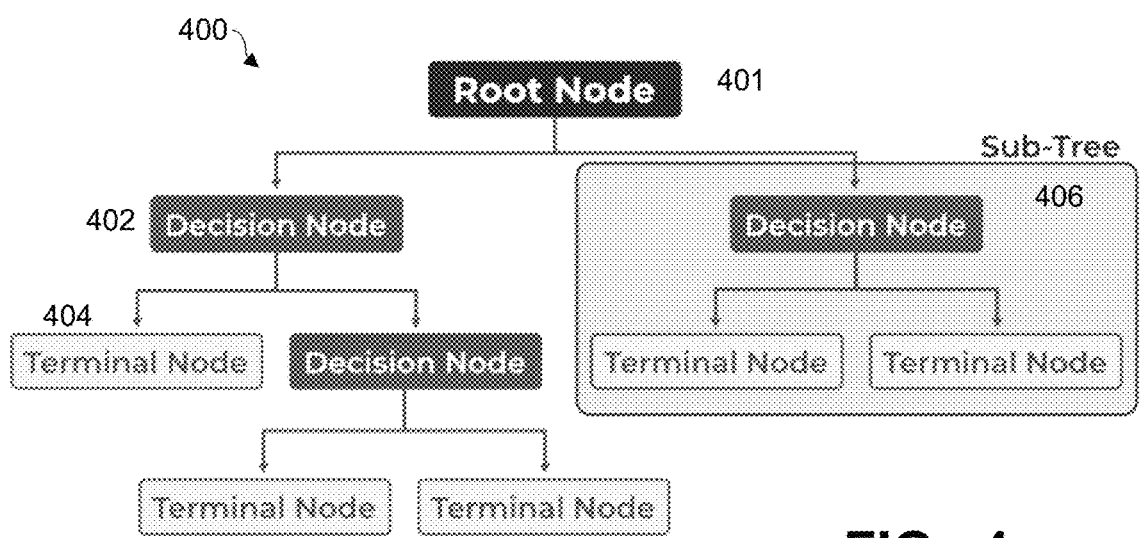
FIG. 4 illustrates an example generic decision tree that can be used in a granular level prioritized protection component, under some embodiments.

FIG. 4 illustrates an example decision tree that can be used in a granular level prioritized protection component, under some embodiments. Decision tree 400 illustrates a generic tree comprising the basic units of a typical tree. The root node 401 is the topmost node in the tree comprising the complete dataset and the starting point of the decision-making process. A decision (or internal) node 402 comprises a choice regarding an input feature. Branching off of decision nodes connects them to leaf (or terminal) nodes 404 or other internal nodes. A leaf node is a node with no child nodes that indicates a class label or a numerical value. The decision tree can also include a sub-tree 406, which is subsection of the decision tree that starts at an internal node and ends at one or more leaf nodes.

A decision tree is often into two or more sub-nodes using a splitting criterion and a selected feature. The splitting criterion is determined by the feature that offers the greatest information gain, It is used to determine the most informative feature to split on at each node of the tree, with the goal of creating pure subsets. Information gain is thus a measure of the reduction in impurity achieved by splitting a dataset on a particular feature in a decision tree, where an impurity is a measurement of the target variable's homogeneity in a subset of data, and refers to the degree of randomness or uncertainty in a set of examples. The Gini index and entropy are two commonly used impurity measurements in decision trees used as classifiers. The variance measures how much the predicted and the target variables vary in different samples of a dataset, and is used for regression problems in decision trees. Variance measures could include mean squared error (MSE), mean absolute error, half Poisson deviance, among others. A tree can be pruned to remove branches from the tree that do not provide any additional information or lead to overfitting.

In an embodiment, the decision tree classifier 304 uses certain defined features of a model 308 to split nodes to acquire information gain regarding the criticality or non-criticality of the input data. The ultimate decision in this case is the binary classification of the input data as critical or not critical (non-critical) based on an evaluation of a number of parameters (or characteristics) that represent features for the model 308 of the classifier 304. In an embodiment, the features include the user designated risk tags, uptime, data change rate, restore frequency, and VMDK.

These are only some representative features, and other or additional features may be used depending on system configuration, use cases, applications, and so on. Other possible features include virtual machine size (disk size, memory), backup timestamp, compression ratio, backup duration, backup success/failure status, backup type (full, incremental, differential), number of snapshots, deduplication ratio, network bandwidth usage during backup, backup storage location, encryption status, retention period, backup storage consumption, backup transfer speed, error count or error rate, CPU usage during backup, number of virtual network interfaces, number of attached storage disks, backup software/version used, backup source (VMware, Hyper-V, etc.), and so on.

With respect to the feature, a VMDK file represents a virtual hard disk drive that contains the operating system, applications, and data of a virtual machine. It simulates a physical hard disk and is stored as a regular file on the host system's file system. The VMDK file format supports features like snapshots, thin provisioning, and various disk formats (e.g., monolithic, split into multiple files, or compressed). VMDK files can be created during the creation of a new VM or added to an existing VM as additional disks. They provide the storage capacity required by the virtual machine and are accessed and managed by the VMware hypervisor. VMDK files can be stored on different types of storage media, such as local disks, NAS, and SANs. By using the VMDK format, VMware virtualization software allows for easy portability and migration of virtual machines across different VMware platforms. It also provides features like VM snapshots for backup and restore purposes, cloning of VMs, and the ability to manage storage efficiency through features like thin provisioning and disk resizing.

Figure 5:
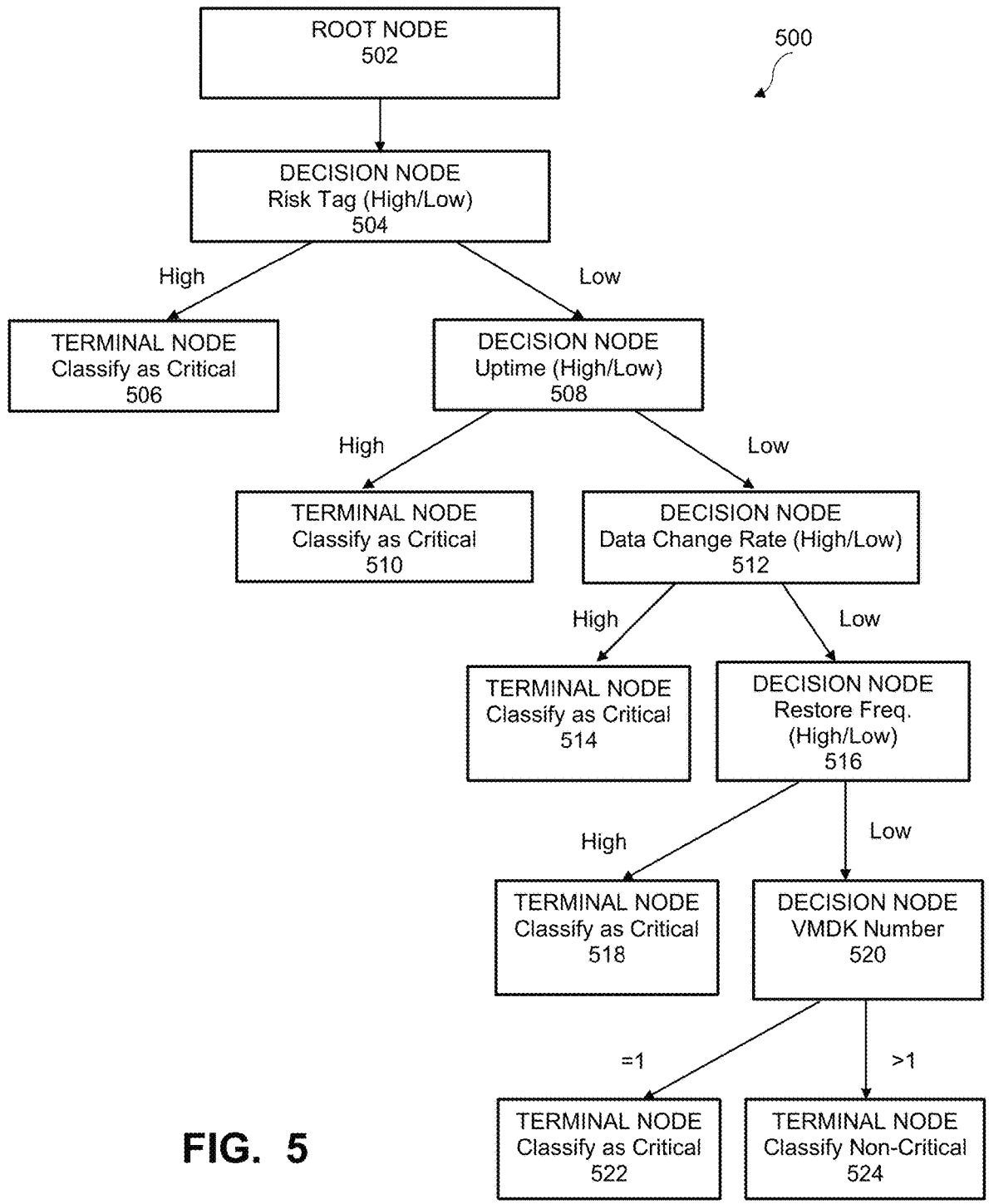
FIG. 5 is an example decision tree for classifying the criticality of an input dataset using certain example features, under an embodiment.

FIG. 5 is an example decision tree for classifying the criticality of an input dataset using certain example features, under an embodiment. For the example decision tree 500 of FIG. 5, the features are given above as: user designated risk tags, uptime, data change rate, restore frequency, and VMDK, and these are used as decision nodes to gain information regarding criticality as shown in FIG. 5.

Decision tree 500 starts with the root node 502. The first feature comprises the first decision node 504, so the tree split on the value of the feature "User designated high risk tags." For the example shown, if the data has a high risk tag, it is classified as "Critical" in terminal node 506. If the data does not have a high risk tag, the tree proceeds to the next split, which is the decision node for the "Uptime" feature 508. This feature can be characterized as high/low (or equivalent values) based on an absolute or percentage amount of time the system is up (for a VM) or the data is active over a past time period. For example, if a VM has been up for more than 99% of the time in the last 30 days, this is considered "high" and it is classified as "Critical" in terminal node 510. If it has been up for less than 99% of the time in the last 30 days, this is considered "low" and the tree proceeds to the next split.

For the example of FIG. 5, the next feature for splitting is the "Data change rate" which can be either high or low depending on amount of data changed per unit time as decided in node 512. If the data or VM has a high data change rate (e.g., more than 20% of the data changes daily), it is classified as "Critical" in terminal node 514. If it has a low data change rate (e.g., less than 20% of the data changes daily), the tree proceeds to the next split at decision node 516. This example node split is on the feature of "Restore frequency" which can be high or low depending on the restore period of the data or VM per unit time. If it is restored frequently (e.g., more than once a week), it is classified as "Critical" in terminal node 518, and if it is restored infrequently (e.g., less than once a week), the tree proceeds to the next split at decision node 520. This example node split is on the VMDK feature, which is a number of VMDKs for a VM. If the VM has more than one VMDK, it is classified as "Non-Critical" in terminal node 524, and if the VM has only one VMDK, it is classified as "Critical" in terminal node 522.

For the example of FIG. 5, the tree 500 ends with the two terminal nodes 522 and 524, and during traversal of the tree, ending in terminal node 524 results in the data asset (e.g., data or VM) as non-critical, while ending in any of nodes 506, 510, 514, 518, and 522 result in the data asset being classified as critical.

As shown in FIG. 5, the decision tree is used to make a series of hierarchical decisions to determine the criticality of a VM (or other data asset). In this case, system 300 first checks if the VM has a high risk tag. If it does, it would be classified as "Critical" regardless of the other features. If it does not have a high risk tag, the process considers its uptime. If it has been up for more than 99% of the time in the last 30 days, it would be classified as "Critical;" if its uptime is less than 99%, the process then considers its data change rate. If it has a high data change rate, it would be classified as "Critical;" if its data change rate is low, the process then considers its restore frequency. If it is restored frequently, it would be classified as "Critical;" if it is restored infrequently, the process then considers the number of VMDKs it has. If it has more than one VMDK, it would finally be classified as "Non-Critical;" if it has only one VMDK, it would be classified as "Critical".

The decision tree example of FIG. 5 shows the case where a relatively healthy number of features (five in this case) allows the Decision Tree model to go for several splits. In general, the larger the number of splits, the greater the reduction in entropy and the chance to maximize the information gain. FIG. 5 is provided for purposes of example only, and any number and type of features can be used depending on system configuration and applications. Likewise, the asset was illustrated as being a VM, but it could be a database, filesystem, file, directory, or any other data object or client.

In an embodiment, the decision tree classifier model 308 is trained based on the historical data from the different assets under a client and uses features to predict and tag the priority of an asset. The critical data or applications under a VM would be assigned with a precedence factor based on criticality determined for smart logical chunks of data. Several attributes to decide the criticality of data chunk can be taken into consideration while training the algorithm. In an embodiment, the data type of an asset may be used to help determine the criticality. For example, critical applications related to finance, medical, disaster recovery data, and so on, can be predefined with highest priority. Other factors can also be used, as illustrated in FIG. 5, and the use of a decision tree ensures efficient and smart asset level prioritized solutions at any appropriate asset granularity, such as directory-level, file-level, and so on. This solution maintain the consistency of data asset relationships and meets the needs of actual priority-based backups.

With reference back to FIG. 3, as shown in system 300, component 301 includes a tagger that tags the asset with the appropriate criticality value, such as a binary "critical" or "non-critical" tag, or a scalar value if a criticality scale is used, such as 0 (very critical) to 5 (non-critical), or similar scale.

In the case of a scaled criticality value and tag, a precedence factor is used to decide the overriding priority of two assets that have the same priority. For this embodiment, a measure or quantity or parameter is defined as a tie breaker in cases where, two of the same asset types are being compared. The degree of criticality of an asset is then used to justifiably prioritize a data object to be restored before the others.

The tag assigned to an asset by tagger 306 is used to assign it to the appropriate protection policy 310. Different policies can be defined and used for the assets based on their priority as derived from their characterization of critical or non-critical, or their relative criticality along a scale. For example, an application hosting data from financial investment banks and medical research institutes may receive a higher criticality score than an application hosting gaming-related data, and may be therefore tagged accordingly. Different protection policies may then be assigned, or the more critical data afforded higher priority within the same policy.

As shown in FIG. 3, system 300 makes use of use of historical data from users that train a model 308 to decide the priority of protection of different data assets to be protected by one or more protection policies. The classifier model used will make use of the all the existing parameters from the historical data from the user environments to decide on the priority application of a protection policy depending upon its features and criticality. This mechanism automatically ensure the object protection at any granularity level as soon as it is received into the user data protection environment.

The model 308 for the classifier 304 is trained with historical data of the clients, datasets, and backups from users and certain laboratory environments to ensure maximum accuracy in the prioritization of new backup objects. The historical data may be amassed from many years operation of deployed systems as well as theoretical or simulated data provided through laboratory simulations. It may also comprise current user configuration and deployment information including presently desired or used attributes and corresponding values.

The tagger 306 assigns criticality tags to data objects to ensure they are appropriately prioritized within the appropriate backup protection policy and cycles. In an embodiment, the criticality tags are classified as P0 (highest priority tag), P1, P2, and so on, but any other or similar hierarchical tag may be used. In an embodiment, the tag comprises a key value having a format of "CRITICALITY_TAG" with an associated encoded scalar value (e.g., P0, P1, P2, etc.), wherein the associated value represents a priority value of a critical data object ranked along a defined scale, and wherein the defined scale is on the order of 1 to 5, in one of ascending or descending order of priority. Such scale levels can also be associated with qualitative descriptions, such as Platinum/Gold/Bronze, or High/Medium/Low, etc. to align with corresponding protection policies.

To tag the client and its data objects, component 301 uses the decision tree model for classifier 304. Different components of a data asset may be classified, for example a client may first be tagged based on criticality factors, and then the data objects under the client are tagged. For example, a client hosting a security-related application will be given a higher priority tag than a client hosting a gaming application. Similarly, a data object such as a file system under the tagged client will undergo further tagging based on the criticality factor of the file system and its usage. This provides different levels of granularity, as well as a lowest level of granularity among clients and data assets.

A similar feature can be made with the properties of data objects that have been used in tailoring the model 308 to fit the embodiment of FIG. 2. For example, if there are two Virtual Machines (Critical and Non-Critical) as labeled data, both would have a set of attributes like: critical strings, nature of the application being hosted number of applications, size, data leg, device ports, data path available, datastore size, provisioning details and so on. This represents only some criticality attributes or parameters (characteristics) and embodiments are not so limited. Any other or additional parameters characterizing the criticality, sensitivity, or specialness of a new data object may be used. Any new introduced data object into the system can be predicted to be classified into a critical or non-critical based on these attributes.

Using this trained model, the most critical data can be prioritized for backup first followed by non-critical data. Such data may also be processed through new or modified policies that dictate important parameters such as backup period, storage target, retention period, data handling, and so on.

Figure 6:
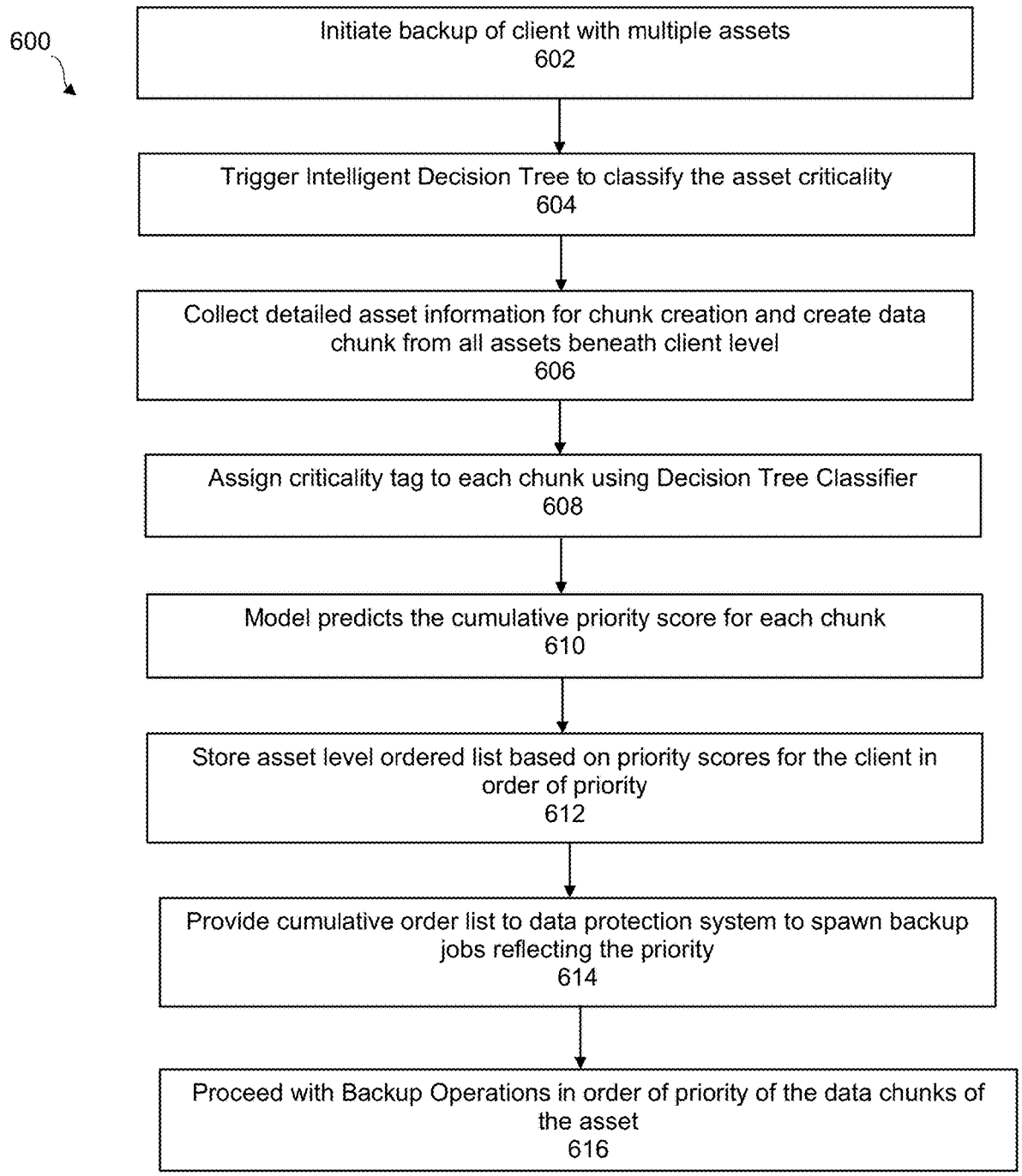
FIG. 6 is a flowchart that illustrates a method of providing granular level prioritized protection using a decision tree process, under some embodiments.

FIG. 6 is a flow diagram illustrating a method of granular-level, priority based data protection, under some embodiments. As shown in FIG. 6, process 600 starts in step 602 with the initiation of a backup request by a user. This backup could involve backing up data assets within a client or clients in a system of multiple clients, such as system 200. The data object/client may be any appropriate elements, such as a virtual machine, filesystem, database, document, and so on. The data asset to be backed is the processed through an intelligent decision tree based classifier, 604. The classifier component 304 uses the trained model to fetch data object features to in order to ultimately classify the data object as critical or non-critical.

For the embodiment of FIG. 6, the process 600 collects detailed asset information to create data chunks from all data objects beneath the client level, 606. This step establishes the granularity of the data asset being protected at the appropriate "molecular" level.

Each data chunk for the asset is then tagged in step 608 with the appropriate criticality tag as classified by the decision tree classifier 304. This tag will ultimately be used to determine the order of the asset in the execution of the data protection policy or operation 310.

The trained model 308 is used to predict the cumulative priority score for each chunk of the data asset, 610. An ordered list of the priority scores is stored in a database of a data lake or other storage, 612. This priorities can be listed according to the metadata criticality value (e.g., P0, P1, P2, etc.) or they can be hierarchically defined along a rank, such as Platinum Protection policy incorporating data objects with the most critical features, followed by Gold, Silver, and Bronze policies in descending order of priority, or any other similar scale.

The cumulative ordered list is then provided to the data protection system to spawn backup jobs that reflect the priorities in the list, 614. The backup jobs are then executed by the backup server in the order of the priority of the data chunks in the asset, 616.

Through this process, the asset is backed up in the order of priority of its data chunks and at a level of granularity at an appropriate level below that of the client. The decision tree classifier leverages the historical backup and restore data to train the its model. The classification is based on the various parameters that help reduce the entropy and maximize the information gain.

Examples of parameters selected to train the model and split the decision nodes into leaf nodes are: user-defined critical tags, size of data change per application, application down time history, backup failure history, stability, score of the sub asset and the data chunk, retention time history, datastore change history, disaster leg factor, completion time history, warning record history, and so. Other features can also be used, as appropriate. The decision tree algorithm plays an important role in predicting the priority scores for the data chunks which then ultimately generates the cumulative value of the score and results in the final classification of criticality.

The input set of data chunks gets prioritized at sub-asset level based on the priority scores, and the decision tree predicts the class (based on priority) of the data chunk starting from the root node of the tree.

As used herein, "supervised learning" refers to a subcategory of machine learning (ML) and artificial intelligence (AI) that is defined by the use of labeled datasets to train algorithms that to classify data or predict outcomes accurately. In an embodiment, a decision tree process is used for the data classification to classify current and new data objects with respect to criticality and backup/restore prioritization within an overall data protection process.

In an embodiment, the granular level prioritized protection component 301 utilizes certain artificial intelligence (AI) and machine learning (ML) processes to evaluate new data objects using various attributes to generate the model 308 and classify data objects and clients as critical or non-critical. Such a process generally uses a training component that continuously trains a machine learning algorithm.

Figure 7:
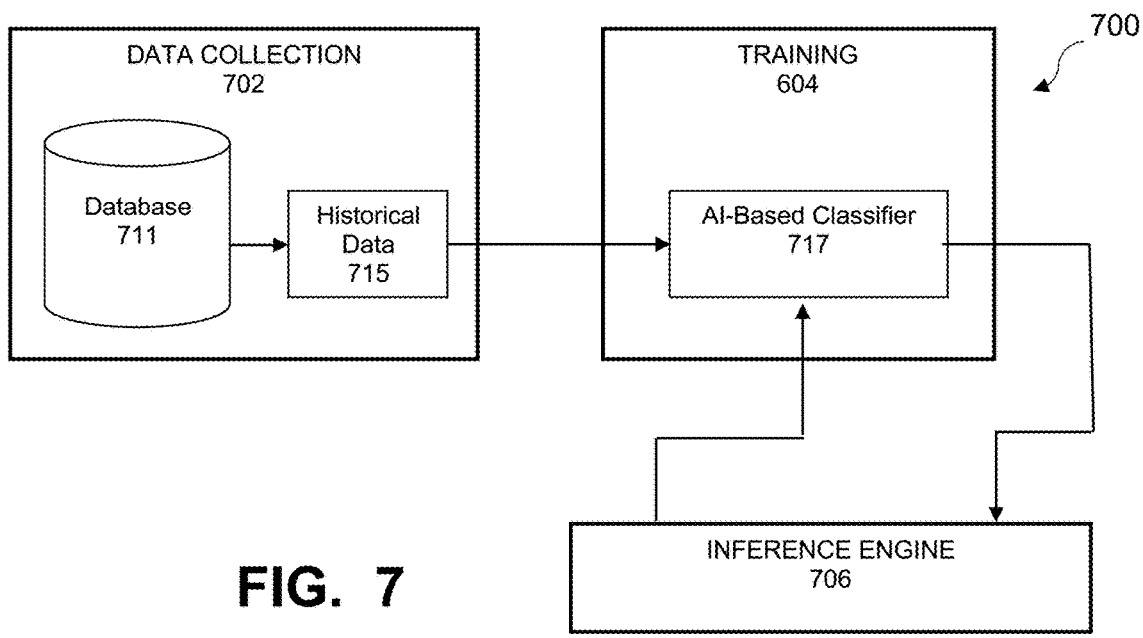
FIG. 7 illustrates a general AI/ML component used in a granular level prioritized protection component, under some embodiments.

FIG. 7 illustrates a general AI/ML component used in a granular level prioritized protection component, under some embodiments. System 700 of FIG. 7 includes a data collection component 702, a training component 704, and an inference component 706. The data collection component 702 can comprise various data loggers and I/O capture devices and databases 711 along with a body of historical information 715 about past data objects, clients, and events (e.g., backup operations). The data collection component 702 continuously monitors and collects data objects and event data to build up its database. This collected information is submitted to the training component 804 through an AI-based analyzer 717. This component continuously trains a machine learning algorithm to identify the data object attributes to thereby determine a relative backup priority of a new data object and/or client. The inference engine 706 also continuously trains the AI/ML algorithms through monitored events.

Though embodiments are described with respect to decision tree based AI methods, the AI component of system 700 may employ any suitable AI classifier algorithm, such as KNN or RNN, or similar algorithm. In general, the performance required to handle the vast variation of data source types and huge size of the big data involved, which may be in zeta bytes of range, may be achieved with low latency and high throughput through embodiments described herein. Furthermore, through these AI processes, the decisions to tag the data object as critical or non-critical is done in real-time. Such AI mechanisms may be scaled and modified for different application needs and system configurations.

Figure 8:
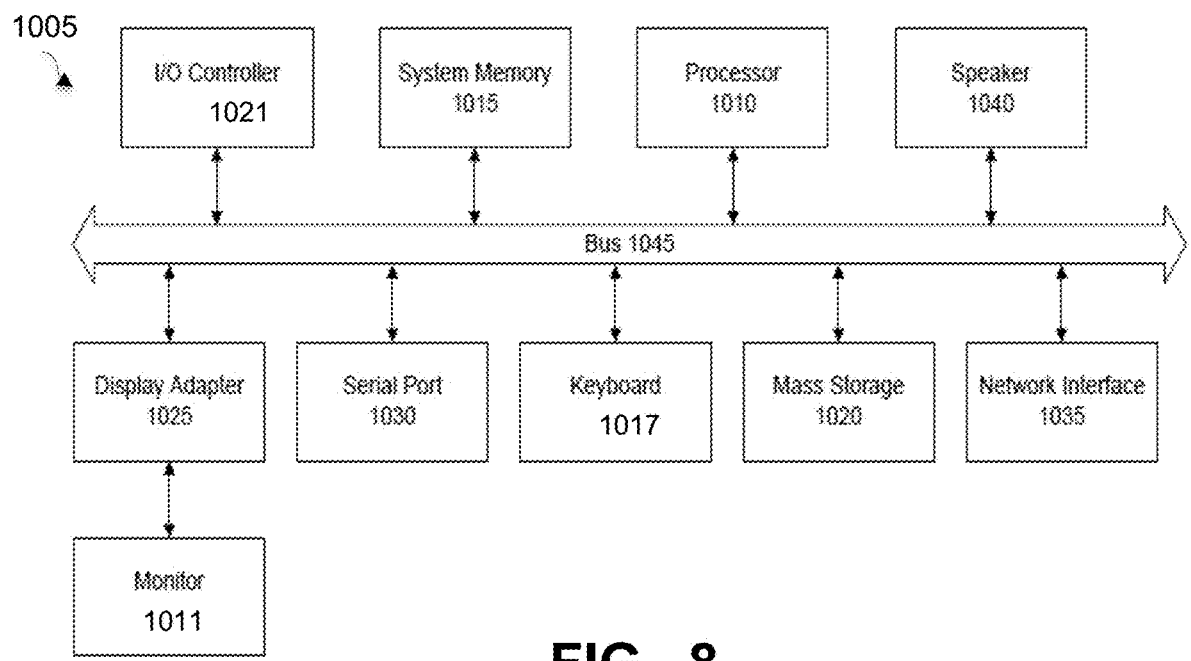
FIG. 8 shows a system block diagram of a computer system used to execute one or more software components of the present system described herein.

The system of FIG. 1 may comprise any number of computers or computing devices in client-server networks including virtual machines coupled over the Internet or similar large-scale network or portion thereof. Each processing device in the network may comprise a computing device capable of executing software code to perform the processing steps described herein. FIG. 8 is a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11x), near field communication (NFC), radio-frequency identification (RFID), mobile or cellular wireless. For example, signals from a computer may be transferred, at least in part, wirelessly to components or other computers.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e., they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of prioritizing a data asset generated by a client for protection in a data protection system, comprising:
   initiating a backup of the data asset by the data protection system;
   classifying the data asset as critical or non-critical based on attributes associated with the data asset;
   determining a hierarchical level of the client relative to other clients in terms of criticality of the data asset and a corresponding backup priority by the data protection system;
   creating data chunks of the data asset at one of a level of granularity within an increasing order of granularity from directory level, file level, and object level, and that are each more granular than a computer level of the client;
   tagging each data chunk of the data chunks with a corresponding criticality tag;
   acquiring, through a decision tree classifier, information regarding the criticality of the data asset based on features including at least one of the criticality tag, data uptime, data change rate, restore frequency, and number of development kits (DK) used for the data asset;
   making a series of hierarchical decisions on a decision tree generated by the decision tree classifier to determine the criticality of the data asset based on the features; and
   backing up each data chunk in an order based on the hierarchical decisions through a policy defined in the data protection system to protect the data at one of the directory level, file level, or object level of granularity for the client.

2. The method of claim 1 wherein the data asset comprises one of a virtual machine, a filesystem, a directory, a file, or a database.

3. The method of claim 1 wherein the criticality tag comprises metadata appended to the data object, and wherein the criticality tag is implemented as an alphanumeric string encoding a protection prioritization based on criticality.

4. The method of claim 3 wherein the tag comprises a key value having a format of "CRITICALITY_TAG" with an associated scalar value, wherein the associated value represents a priority value of a corresponding object ranked along a defined scale, and wherein the defined scale is on the order of 1 to 5, in one of ascending or descending order of priority.

5. The method of claim 1 further comprising training a model for the decision tree classifier using historical data of data objects and clients including present and past users and laboratory environments to establish past priorities of protection of user data.

6. The method of claim 5 wherein the classifying utilizes an artificial intelligence (AI) based component comprising a data collection component, a training component, and an inference component, and contains historical information regarding data assets and clients of the network to continuously train a machine learning (ML) algorithm to identify backup prioritization of the user data.

7. The method of claim 1 wherein a decision tree comprises a root node and a plurality of decision nodes and terminal nodes, wherein the terminal nodes end with a classification of the data asset as critical or non-critical.

8. The method of claim 7 wherein the features include criticality parameters that are selected from a group consisting of: user-defined critical tags, size of data change per application, application down time history, backup failure history, stability, score of a sub asset and the data chunk, retention time history, datastore change history, disaster leg factor, completion time history, and warning record history.

9. The method of claim 8 wherein each of the decision nodes is assigned to a unique parameter of the criticality parameters.

10. The method of claim 9, each decision node splits the decision tree based on a value of a criticality parameter represented by a corresponding decision node to a terminal node or another decision node.

11. The method of claim 10 wherein a final terminal node of the decision tree ends with a classification of the data asset as non-critical.

12. A system for prioritizing a data asset generated for protection in a data protection system, comprising:
 a client sourcing the data asset, wherein the data asset comprises one of a virtual machine, a filesystem, a directory, a file, or a database;
 a backup server initiating a backup of the data asset by the data protection system, and determining a hierarchical level of the client relative to other clients in terms of criticality of the data asset and a corresponding backup priority by the data protection system;
 a processor-based classifier classifying the data asset as critical or non-critical based on attributes associated with the data asset, and creating data chunks of the data asset at one of a level of granularity within an increasing order of granularity from directory level, file level, and object level, and that are each more granular than a computer level of the client; and
 a tagger tagging each data chunk of the data chunks with a corresponding criticality tag;
 a decision tree component acquiring information regarding the criticality of the data asset based on features including at least one of the criticality tag, data uptime, data change rate, restore frequency, and number of development kits (DK) used for the data asset, and making a series of hierarchical decisions on a decision tree generated by the decision tree classifier to determine the criticality of the data asset based on the features; and
 a backup processor backing up each data chunk in an order based on the hierarchical decisions through a policy defined in the data protection system to protect the data at one of the directory level, file level, or object level of granularity for the client.

13. The system of claim 12 wherein the criticality tag comprises metadata appended to the data object, and wherein the criticality tag is implemented as an alphanumeric string encoding a protection prioritization based on criticality and further wherein the tag comprises a key value having a format of "CRITICALITY_TAG" with an associated scalar value, wherein the associated value represents a priority value of a corresponding object ranked along a defined scale, and wherein the defined scale is on the order of 1 to 5, in one of ascending or descending order of priority.

14. The system of claim 13 wherein the classifier uses a model trained using historical data of data objects and clients including present and past users and laboratory environments to establish past priorities of protection of user data, and wherein the classifier utilizes an artificial intelligence (AI) based component comprising a data collection component, a training component, and an inference component, and contains historical information regarding data assets and clients of the network to continuously train a machine learning (ML) algorithm to identify backup prioritization of the user data.

15. The system of claim 14 wherein the decision tree comprises a root node and a plurality of decision nodes and terminal nodes, wherein the terminal nodes end with a classification of the data asset as critical or non-critical, and wherein the features include criticality parameters that are selected from a group consisting of: user-defined critical tags, size of data change per application, application down time history, backup failure history, stability, score of a sub asset and the data chunk, retention time history, datastore change history, disaster leg factor, completion time history, and warning record history.

16. The method of claim 15 wherein each of the decision nodes is assigned to a unique parameter of the criticality parameters, and wherein each decision node splits the decision tree based on a value of a criticality parameter represented by a corresponding decision node to a terminal node or another decision node, and further wherein a final terminal node of the decision tree ends with a classification of the data asset as non-critical.

17. A tangible computer program product having stored thereon program instructions that, when executed by a process, cause the processor to perform a method of initiating a backup of the data asset by the data protection system;
 classifying the data asset as critical or non-critical based on attributes associated with the data asset;
 determining a hierarchical level of the client relative to other clients in terms of criticality of the data asset and a corresponding backup priority by the data protection system;
 creating data chunks of the data asset at one of a level of granularity within an increasing order of granularity from directory level, file level, and object level, and that are each more granular than a computer level;
 tagging each data chunk of the data chunks with a corresponding criticality tag;
 acquiring, through a decision tree classifier, information regarding the criticality of the data asset based on features including at least one of the criticality tag, data uptime, data change rate, restore frequency, and number of development kits (DK) used for the data asset;
 making a series of hierarchical decisions on a decision tree generated by the decision tree classifier to determine the criticality of the data asset based on the features; and
 backing up each data chunk in an order based on the hierarchical decisions through a policy defined in the data protection system to protect the data at the one of the directory level, file level, or object level of granularity for the client.

18. The product of claim 17 wherein the method further comprises a model trained using historical data of data objects and clients including present and past users and laboratory environments to establish past priorities of protection of user data, and wherein the classifier utilizes an artificial intelligence (AI) based component comprising a data collection component, a training component, and an inference component, and contains historical information regarding data assets and clients of the network to continuously train a machine learning (ML) algorithm to identify backup prioritization of the user data.

19. The product of claim 18 wherein the criticality tag comprises metadata appended to the data object, and wherein the criticality tag is implemented as an alphanumeric string encoding a protection prioritization based on criticality and further wherein the tag comprises a key value having a format of "CRITICALITY_TAG" with an associated scalar value, wherein the associated value represents a priority value of a corresponding object ranked along a defined scale, and wherein the defined scale is on the order of 1 to 5, in one of ascending or descending order of priority.

* * * * *